June 7, 1932. D. E. RUDERT 1,862,319
STORAGE BATTERY CONSTRUCTION
Filed Nov. 12, 1928
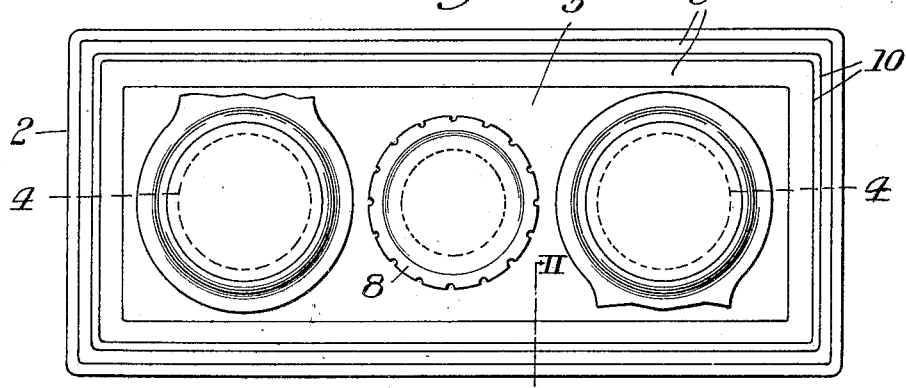
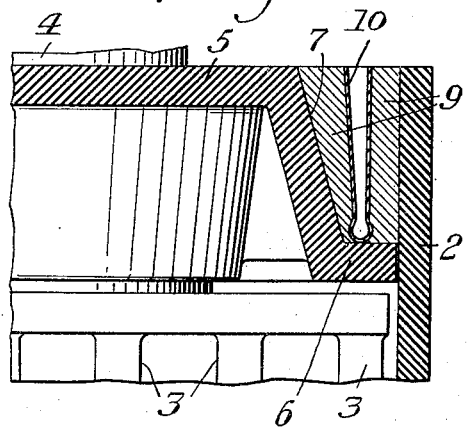
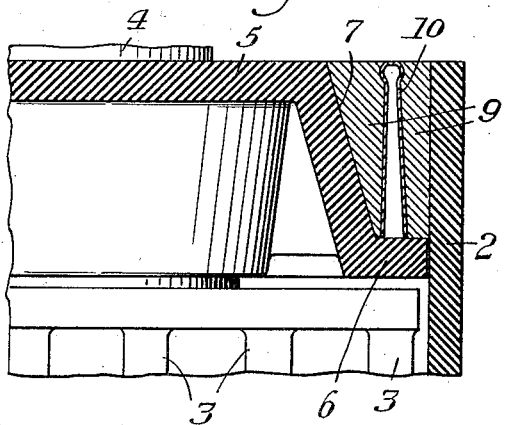
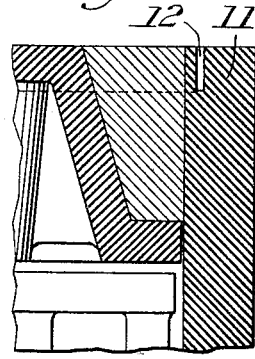
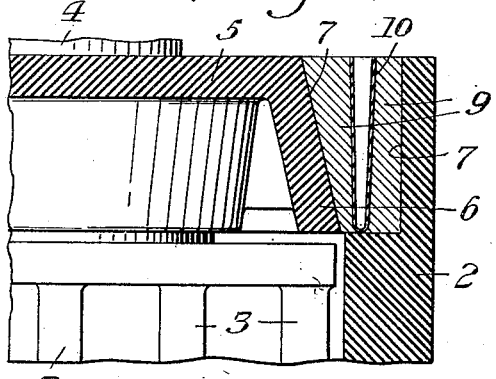
INVENTOR
Dale E. Rudert
by Byrne, Stebbins & Parmelee
his attorneys Patented June 7, 1932

1,862,319

UNITED STATES PATENT OFFICE

DALE E. RUDERT, OF SAXONBURG, PENNSYLVANIA

STORAGE BATTERY CONSTRUCTION

Application filed November 12, 1928. Serial No. 318,760.

Storage batteries are usually made up of a number of jars or cells containing the battery plates and electrolyte, and each such jar or cell is provided with a cover which is sealed thereto by means of a plastic sealing compound which hardens after the joint is made. The usual sealing compound is a tarry substance which becomes plastic to the point of fluidity on being heated, and which solidifies upon cooling. The battery cell and cover have cooperating walls forming a peripheral recess into which the sealing compound is poured after being heated. After the sealing compound has cooled it becomes hard.

The hardened sealing compound, particularly at low temperatures, becomes brittle and is subject to cracking. Cracking is most likely to occur in batteries used in motor vehicles due to the jarring and vibrations caused during operation thereof, and in cold weather it very frequently occurs that the hardened sealing compound will be badly cracked so as to permit leakage of the electrolyte out of the cells. Even in moderate weather when a battery is subjected to severe shocks and jolts it often happens that the sealing compound is cracked or loosened at the joint. This cracking results in severe damage to the battery, often making it necessary to recharge the battery or to entirely replace it.

I provide a storage battery construction and method of assembling a storage battery adapted to eliminate the disadvantages above mentioned. I provide a battery construction having a resilient joint between a cell and its cover which entirely prevents or greatly minimizes, even under severe conditions, cracking of the sealing compound and consequent leakage of the electrolyte. I provide a battery cell, a cover therefor, sealing means for sealing the joint between the cell and cover, and resilient means in the joint. I further provide a method of assembling a storage battery, comprising placing a cover in position on a cell, placing sealing means in the joint between the cell and cover, and also placing resilient means in the joint.

In the accompanying drawing I have shown certain present preferred embodiments of the invention, wherein, Figure 1 is a plan view of a battery cell with its cover in place, Figure 2 is a cross section taken on the line II—II of Figure 1, and Figures 3, 4 and 5 are views similar to Figure 2, showing modified constructions.

Referring more particularly to the drawing, reference numeral 2 designates generally a battery jar or cell containing battery plates 3 connected to terminal posts 4. Cooperating with the cell 2 is a cover 5 having a portion 6 cooperating with the side wall of the cell to form a cavity 7 for receiving sealing means for sealing the cover to the cell. The cover is provided with suitable openings through which the terminal posts 4 pass, and a central filling opening provided with a cap 8. In batteries as heretofore known, the cavity 7 has been filled with sealing compound.

In the cavity 7, for forming a joint between the cell and its cover, I place a quantity of sealing compound 9. In such cavity I also place a substantially continuous U-shaped resilient metal strip 10. This strip is imbedded in the sealing compound and substantially divides it into two segregated masses. Due to the resiliency or flexibility of the strip 10, even though the sealing compound 9 has become hard and brittle, shocks and vibrations will not cause a cracking of the sealing compound because the oppositely disposed substantially segregated masses thereof are permitted to move slightly relative to each other without sustaining such a stress as will result in fracture. When stresses are brought to bear on the battery, what slight movement may be necessary in the joint is taken up by the resilient strip, thus leaving the oppositely disposed masses of sealing compound intact. Consequently a liquid-tight joint is at all times maintained, thus effectively sealing the cell against leakage of electrolyte.

Although in certain of the present preferred embodiments of the invention I have described and illustrated the use of a U-shaped metal strip, I also contemplate the use of a suitable resilient or flexible substance other than metal which may or may not extend substantially continuously around the cell. The form of the strip may be other than U-shaped, depending upon the substance used, and its method of insertion in the joint. For instance, a flat strip of soft rubber may be used. The resilient strip preferably extends from top to bottom of the sealing compound, but it is not essential that it do so as the desired effect may be obtained when the strip extends only part way, although the effect will not of course be as pronounced as otherwise.

In Figures 2 and 4, the resilient strip is shown with the cross bar of the U downwardly, whereas in Figure 3 the cross bar is disposed upwardly. This is a matter of preference, either construction serving the desired purpose. An advantage in the arrangement of Figure 3 is that dirt or foreign matter which may come in contact with the top of the battery will not fill up the space between the opposite portions of the strip. However, the strip as shown in the drawing is spread apart more than will normally be the case in a battery construction for the purpose of more clearly illustrating the invention. The opposite portions of the strip may substantially contact and yet if they are free to move relatively one to the other the resiliency will be sufficient to prevent cracking.

The strip shown in Figures 2 and 3 is provided with a slightly bulged, rounded extremity for the purpose of making it somewhat more resilient than that shown in Figure 4. The difference in resiliency is slight, but in the larger sized batteries the bulged strip is preferred.

In Figures 2 and 3, the portion 6 of the cover is shown as substantially horizontal and extending laterally to meet the upright wall of the cell 2. Substantially the same effect is obtained in the construction shown in Figure 4 wherein the wall of the cell is recessed and the horizontally projecting flange on the cover is dispensed with. In either case the cavity 7 is provided for the reception of the means forming the joint.

In assembling the battery, I prefer to first pour in the heated sealing compound and to then introduce into the compound the strip 10. This method is found to be simple and speedy, particularly when the strip is inserted in the position shown in Figures 2 and 4. When, however, the strip is to assume the position of Figure 3, it is preferable to first place the strip in the cavity 7 and then pour the sealing compound in on both sides of the strip. In certain cases a pair of independent strips may be used, although it is preferable to use a single bent-over strip to insure a sealing completely across the joint.

A modified construction is shown in Figure 5, wherein reference numeral 11 designates the wall of the cell or battery. Such wall is provided at its upper portion with a vertically extending slot 12 which divides the wall into inner and outer portions. Preferably the slot 12 is near the inner face of the wall so that the portion between the slot and the sealing compound is resilient. Such portion may give due to expansion and contraction of the sealing compound and thus prevent it from cracking and consequent leakage from the cell. This construction is particularly applicable to batteries wherein a solid rubber case divided by integral rubber partitions to form the cells is used. Most modern batteries are constructed in this manner.

The embodiments of Figures 1 to 4 inclusive apply equally well to batteries having solid rubber cases or batteries having wooden cases in which rubber jars are disposed. In any case where the thickness of the cell wall is great enough, a slot may be provided for making the wall resilient and thus preventing cracking of the sealing compound. Ordinarily when such a slot is provided, the strip 10 shown in Figures 1 to 4 inclusive is omitted, although the two may be combined in the same construction, thus providing a double safe-guard against leakage.

While I have shown and described certain present preferred embodiments of the invention, I wish it distinctly understood that the same is not limited thereto but may be otherwise embodied and practiced within the scope of the following claims.

I claim:

1. In a storage battery, a cell, a cover therefor, sealing means for sealing the joint between the cell and cover, and flexible metal means having relatively movable portions in the joint.

2. In a storage battery, a cell, a cover therefor, sealing means for sealing the joint between the cell and cover, and a continuous flexible strip having relatively movable portions in the joint.

3. In a storage battery, a cell, a cover therefor, and sealing means between the cell and cover, the sealing means being resiliently divided in a generally vertical direction.

4. In a storage battery, a cell, a cover therefor, sealing means in the joint between the cell and cover, and means connected with the sealing means for resiliently dividing the same generally in the direction of the depth of the joint into a plurality of substantially segregated masses.

5. In a storage battery, a cell, a cover therefor, sealing means for sealing the joint between the cell and cover, and a bent-over strip of flexible material in the joint, the opposite portions of such bent-over strip being generally parallel and free to move together.

6. In a storage battery, a cell, a cover therefor, sealing means for sealing the joint between the cell and cover, and a substantially continuous bent-over strip in the joint, such bent-over strip extending substantially to the top of the sealing means.

7. In a storage battery, a cell, a cover therefor, sealing material for sealing the joint between the cell and cover, and means disposed in a generally vertical position in contact with the sealing material for providing for relative movement of portions of the sealing material.

In testimony whereof I have hereunto set my hand.

DALE E. RUDERT.